United States Patent
Shrotri et al.

(10) Patent No.: US 8,977,533 B2
(45) Date of Patent: Mar. 10, 2015

(54) SYSTEM AND METHOD FOR DETECTING UNREACHABLE STATES IN A STATEMATE STATECHART MODEL

(75) Inventors: Ulka Shrotri, Pune (IN); Venkatesh Ramanathan, Pune (IN); Ravindra Metta, Pune (IN)

(73) Assignee: Tata Consultancy Services Limited, Maharashtra (IN)

(*) Notice: Subject to any disclaimer, the term of this patent is extended or adjusted under 35 U.S.C. 154(b) by 363 days.

(21) Appl. No.: 13/023,900

(22) Filed: Feb. 9, 2011

(65) Prior Publication Data

US 2012/0203534 A1    Aug. 9, 2012

(51) Int. Cl.
*G06F 9/45*    (2006.01)
*G06F 11/28*    (2006.01)

(52) U.S. Cl.
CPC ............... *G06F 8/433* (2013.01); *G06F 11/28* (2013.01)
USPC .......................................................... 703/22

(58) Field of Classification Search
None
See application file for complete search history.

(56) References Cited

U.S. PATENT DOCUMENTS

2009/0193416 A1*    7/2009    Kahlon ............... 718/100

OTHER PUBLICATIONS

Chan, W.; Anderson, R.J.; Beame, P.; Jones, D.H.; Notkin, D.; Warner, W.E.; , "Decoupling synchronization from local control for efficient symbolic model checking of statecharts," Software Engineering, 1999. Proceedings of the 1999 International Conference on, vol., no., pp. 142-151, May 22-22, 1999.*
Gérard Cécé and Alain Finkel. 2005. Verification of programs with half-duplex communication. Inf. Comput. 202, 2 (Nov. 2005), 166-190.*
Jacob Katz, Ziyad Hanna, and Nachum Dershowitz. "Space-Efficient Bounded Model Checking" In Proceedings of the conference on Design, Automation and Test in Europe—vol. 2 (DATE'05), vol. 2. IEEE Computer Society, Washington, DC, USA, 686-687 Mar. 2005.*
Schneider, K.; Brandt, J., "Performing causality analysis by bounded model checking", Application of Concurrency to System Design, ACSD 2008. pp. 78,87, Jun. 23-27, 2008.*
Werner Damm, Bernhard Josko, Hardi Hungar, and Amir Pnueli, A Compositional Real-time Semantics of STATEMATE Designs, W.-P. de Roever, H. Langmaack, and A. Pnueli (Eds.): COMPOS'97, LNCS 1536, pp. 186-238, 1998. Springer-Verlag Berlin Heidelberg 1998.*
A. Biere, A. Cimatti, E. Clarke, O. Strichman, Y. Zhu, Bounded Model Checking, Advances in Computers, vol. 58 Academic Press (2003).*
"Rationale Statemate," <http://www.ibm.com/software/awdtools/statemate/>, accessed Jan. 15, 2011.

(Continued)

*Primary Examiner* — Omar Fernandez Rivas
*Assistant Examiner* — Robert Brock
(74) *Attorney, Agent, or Firm* — Oliff PLC

(57) ABSTRACT

The present invention provides a system and method for detecting unreachable states in a large commercial Statemate Statechart model. A system for checking the reachability of any given state in a Statemate Model, the said system comprises: an input means for receiving an Original Statemate Model (OSM), output means for displaying the result to a user, and a processor, wherein the processor is capable of executing the programmed instructions to: transform the OSM into First Statemate Model (FSM) by using translator; transform the OSM into Second Statemate Model (SSM) based on the determined length of the super step such that the set of all initial configurations of the SSM is a superset of all the stable configurations of the OSM by using translator; check the reachability of states of the OSM in the SSM by using bounded model checker (BMC); and send the result to the output means.

14 Claims, 2 Drawing Sheets

(56) References Cited

OTHER PUBLICATIONS

Clarke et al., "Counterexample-guided Abstraction Refinement," *Computer Aided Verification (CAV'00)*, 2000, pp. 154-169.

Harel et al., "The STATEMATE Semantics of Statecharts," *ACM Transactions on Software Engineering and Methodology*, Oct. 1996, pp. 293-333, vol. 5, No. 4, ACM.

Kulkarni et al., "Scaling up Model-checking," *Proceedings of the GM R&D Workshop*, Jan. 2007, pp. 1-11, Bangalore, India <http://www.springerlink.com/index/k061135783425944.pdf>.

De Moura et al., "Bounded Model Checking and Induction: From Refutation to Verification," *In CAV'03*, 2003, pp. 1-13.

Jhala et al, "Software Model Checking," *ACM Computing Surveys*, Oct. 2009, vol. 41, No. 4, Article 21.

Shrotri et al., "Proving Unreachability using Bounded Model Checking," *ISEC '10*, Feb. 25-27, 2010, pp. 73-82, 2010, ACM, New York.

"Statemate ATG," <http://www.btc-es.de/index.php?idcatside=8&langr=2>, accessed Jan. 15, 2011.

"Symbolic Analysis Laboratory," <http://sal.csl.sri.com/>, accessed Jan. 15, 2011.

Harel et al., "Modeling Reactive Systems with Statecharts: The Statemate Approach," 1998, ISBN 0-07-026205-5, The McGraw-Hill Companies, Inc.

De Moura et al., "The SAL Language Manual," *CSL Technical Report SRI-CSL-01-02* (Rev. 2), Aug. 2003, SRI International.

Sheeran et al., "Checking safety properties using induction and a SAT-solver," *LNCS*, 2000.

Berry et al., "The Esterel Synchronous Programming Language: Design, Semantics, Implementation," *Science of Computer Programming*, 1992, pp. 1-51.

Bhaduri et al., "Model Checking of Statechart Models: Survey and Research Directions," Feb. 1, 2008, pp. 1-41.

McMillan, "Symbolic Model Checking: An approach to the state explosion problem," May 1992, pp. 1-212.

Biere et al., "Symbolic Model Checking using SAT procedures instead of BDDs," Feb. 1, 1999, pp. 1-13.

Huth, "Some current topics in model checking," *International Journal on Software Tools for Technology Transfer (STTT)*, Feb. 6, 2006, pp. 1-11.

Atiya et al., "Towards a Benchmark for Model Checkers of Asynchronous Concurrent Systems," *Technical Report YCS-2006-399*, Apr. 2006, pp. 1-47.

Booch et al., "The Unified Modeling Language User Guide," Oct. 20, 1998, pp. 1-512, Addison-Wesley Longman Inc., ISBN 0-201-57168-4.

Pike, "Real-Time System Verification by $k$-Induction," *NASA/TM-2005-213751*, Apr. 2005, pp. 1-61, <http://www.cs.Indiana.edu/~lepike/pub_pages/reint.html>.

\* cited by examiner

SYSTEM AND METHOD FOR DETECTING UNREACHABLE STATES IN A STATEMATE STATECHART MODEL

FIELD OF THE INVENTION

The present invention relates to detecting the unreachable states in a statemate statechart model and it more generally relates to system and method for verification of properties of safety-critical embedded software requirement in the statemate statechart models.

PRIOR-ART REFERENCES 1) http://www.ibm.com/software/awdtools/statemate/
2) E. Clarke, O. Grumberg, S. Jha, Y. Lu, and H. Veith, Counterexample guided abstraction refinement, in *Computer Aided Verification* (CAV'00). Springer, 2000, pp. 154.169, LNCS 1855.
3) Harel, D. and Naamad, A. 1996. The STATEMATE semantics of statecharts. ACM Trans. Softw. Eng. Methodol. 5, 4 (October), 293-333.
4) A. Kulkarni, R. Metta, U. Shrotri, and R. Venkatesh. Scaling up Model-Checking, A Case Study. In Next Generation Design and Verification Methodologies for Distributed Embedded Control Systems. Proceedings of the GM R&D Workshop, Bangalore, India, January 2007. Available at http://www.springerlink.com/index/k061135783425944.pdf
5) De Moura, L., and Ruess, H. Bounded model checking and induction: From refutation to verification. In CAV'03. LNCS 2725. Springer-Verlag, 14} U26.
6) Jhala, R., and Majumdar, R. Software model checking. ACM Computing Surveys, 41(4):1} U54, 2009
7) Shrotri, U., Venkatesh, R., and Metta, R. 2010. Proving unreachability using bounded model checking. In *Proceedings of the 3rd India Software Engineering Conference* (Mysore, India, Feb. 25-27, 2010). ISEC '10, ACM, New York, N.Y., 73-82. DOI=http://doi.acm.org/10.1145/1730874.1730891
8) Statemate ATG. Web page: http://www.osc-es.de/index.php?lang=2&idcat=21
9) http://sal.csl.sri.com/
10) Harel, D., and Naamad, A. 1991. The Language of Statemate. I-Logix Inc.
11) SAL Language Manual. Available at: http://SAL.csl.sri.com/doc/lanaguge-report.pdf
12) Sheeran, M., Singh, S., and Stalmarck, G. Checking safety properties using induction and a SAT-solver.LNCS, 1954:108, 2000.
13) Berry, G., and Gonthier, G. The Esterel synchronous programming language: Design, semantics, implementation. Science of Computer Programming. 19(2):87-152, 1992.
14) Bhaduri, P., and Ramesh, S. Model checking of statechart models: Survey and research directions. http://www.citebase.org/cgi-bin/citations?id=oai:arXiv.org:cs/0407038, 2004
15) McMillan, K., L. Symbolic Model Checking. Kluwer Academic Publishers, Norwell, Mass., 1993.
16) Biere, A., Cimatti, A., Clarke, E. M., Fujita, M., and Zhu, Y. Symbolic model checking using SAT procedures instead of BDDs. Design Automation conference, 1999. ACM, 317 U320.
17) Huth, M. Some current topics in model checking. International Journal on Software Tools for Technology Transfer (STTT), February 2007. 25-36.
18) Atiya, D., Cataño, N. and Luttgen, G. Towards a benchmark for model checkers of asynchronous concurrent systems. Technical Report YCS-2006-399, Department of Computer Science, University of York, England, April 2006.
19) Booch, G., Rumbaugh, J., and Jacobson, I. The Unified Modeling Language. User Guide. Addison-Wesley, 1998.
20) Pike, L. Real-Time System Verification by k-Induction. Technical Report TM-2005-213751, NASA Langley Research Center, May, 2005. Available at: http://www.cs.indiana.edu/~lepike/pub_pages/reint.html

BACKGROUND OF THE INVENTION

Statecharts were proposed as a visual depiction mechanism for capturing requirements of reactive software such as automotive, avionics and health care software. It is critical that such software is error-free as any defects in such software could potentially cause loss of life as well as loss of business. Model checking technology as mentioned in reference number 6 of the prior-art references is a usual choice for checking such software for defects.

Model checking can prove the absence of certain kinds of errors as opposed to testing, which can only show the presence of errors and not the absence. A model checker is a tool that applies model checking technology. A model checker takes 2 inputs: a model that needs to be checked and a property of the model that needs to be checked. It then determines whether the model satisfies the property. If the model does not satisfy the property, then the model checker outputs a test case for which the property is violated.

There are many free and commercial model checkers. Of these, the only known model checker that can check Statemate statecharts is the Statemate model checker as mentioned in reference number 1 of the prior-art references. To check for the reachability of a state a model checker analyses all states along all paths starting from the set of valid initial states. Large complex models have long paths resulting in a very large number of states to be analysed. This model checker takes weeks to analyze large commercial statemate statechart models (consisting of 100s of charts) and runs out of memory. This is the state explosion problem.

Bounded model checkers address this problem by imposing a bound on the length of paths they analyse. Bounded model checkers analyse all states along all paths but each path is analysed only up to a user-defined length. This limit on the path length allows bounded model checkers to scale up but with a caveat: a state reported as unreachable by a bounded model checker maybe reachable via a path longer than the bound.

An invention known to us which deals with analyzing large commercial statemate statechart model is as follows:

As mentioned in reference number #20 of the prior-art references, Pike et al. describes an application of k-induction for the verification of real time systems. Analysis using k-induction for a given model M, property P and bound k consists of two steps:

1. Base step: Check if P holds in all paths of length k starting from every initial state of M
2. Inductive step: For every path of length k+1 starting from any arbitrary state, check if P is true for the first k states then P is also true for the k+1th state.

If the above two checks return true then the model M satisfies the property P. Since both the checks analyse only paths of length k and k+1 they can be performed using bounded model checking. k-induction, thus, is a technique that can be used to prove properties using bounded model checking. The second step of k-induction checks paths that start with an arbitrary state s where P holds and explore all possible paths of length k+1 starting with s. If P is violated in a path, then one needs to check if the arbitrary start state s of the path is reachable in the actual model. If s is not a reachable state, then the counter example is spurious and one needs to augment the inductive specification with constraints on the state space to prune the observed unreachable states until either P is satisfied or a valid counter example is encountered. If k-induction throws up a path that does not start from an initial state then there are two actions that can be taken:

1. Keep tightening P to exclude spurious initial states from the inductive step or
2. Keep increasing k However, both of the above steps may not scale up for large systems. Further, in the case of Statemate models k-induction is hardly effective.

Thus, in the light of the above mentioned state of art, it is evident that, there is a need for a system and method which:
- analyzes large commercial statemate statechart models in less time and utilizes minimum memory of the computing device;
- detects the unreachable states in large commercial statemate statechart model;
- proves the unreachability of the unreachable states in the large commercial statemate statechart model;
- checks the reachability of the states in the large commercial statemate statechart model; and
- successfully verifies all properties such as state reachability of large commercial statemate statecharts models.

SUMMARY OF THE INVENTION

Before the present systems and methods, enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention which will be limited only by the appended claims.

The primary objective of the present invention is to provide a system and method for analyzing large commercial statemate statechart models at less time by utilizing the minimum memory of the computing device.

Another significant objective of the invention is to detect the unreachable states in a Statemate Statechart model in a novel manner that is far more scalable than existing techniques.

Further another objective of the invention is to establish the unreachability of the unreachable state in the large commercial statemate statechart model.

Yet another objective of the invention is to check reachability of the states in large commercial statemate statechart model.

Still another objective of the invention is to successfully verify all properties such as state reachability of large commercial statemate statechart models.

The present invention provides a system and method for detecting unreachable states in a Statemate Statechart model in a novel manner that is far more scalable than existing techniques.

In accordance to one aspect of the invention, a system is proposed that checks the reachability of all states in a Statemate Model, the said system comprises: an input means for receiving an Original Statemate Model (OSM), output means for displaying the result to a user, and a processor, wherein the processor is capable of executing the programmed instructions to: transform the OSM into First Statemate Model (FSM) such that the set of initial configurations of the FSM is a super set of the set of all stable configurations of the OSM; determine maximum length of the super step of the FSM; transform the OSM into Second Statemate Model (SSM) based on the determined length of the super step such that the set of all initial configurations of the SSM is a superset of all the stable configurations of the OSM by using translator; check the reachability of states, or any other such property, of the OSM in the SSM by using bounded model checker; and send the result to the output means.

In accordance with various aspects of the invention, the above mentioned system also detects the unreachable states in the OSM by using bounded model checker on the SSM, check iteratively the SSM for state reachability within a depth of the determined length of the super step by using bounded model checker for establishing the unreachability of the unreachable state in the OSM and verify a given property of the OSM by using bounded model checker upto the determined length of the super step on the SSM.

In accordance with another aspect of the invention, a method for checking the reachability of any given state in a Statemate Model is proposed, The said method comprises the processor implemented steps of: transforming the Original Statemate Model (OSM) into First Statemate Model (FSM) such that the set of initial configurations of the FSM is a super set of the set of all stable configurations of the OSM; determining maximum length of the super step of the FSM; transforming the OSM into Second Statemate Model (SSM) based on the determined length of the super step such that the set of all initial configurations of the SSM is a superset of all the stable configurations of the OSM by using translator; and checking the reachability of states, or any other such property, of the OSM in the SSM by using bounded model checker (BMC).

In accordance with various aspects of the invention, the above mentioned method is capable of detecting the unreachable states in the OSM by using BMC on the SSM, checking the SSM for state reachability within a depth of the determined length of the super step by using BMC for establishing the unreachability of the unreachable state in the OSM and verifying a given property of the OSM by using BMC upto the determined length of the super step on the SSM.

BRIEF DESCRIPTION OF THE DRAWINGS

The foregoing summary, as well as the following detailed description of preferred embodiments, are better understood when read in conjunction with the appended drawings. For the purpose of illustrating the invention, example construction of the invention is shown in the drawings; however, the invention is not limited to the specific methods and system disclosed. In the drawings.

DETAILED DESCRIPTION OF THE INVENTION

Figure 1:
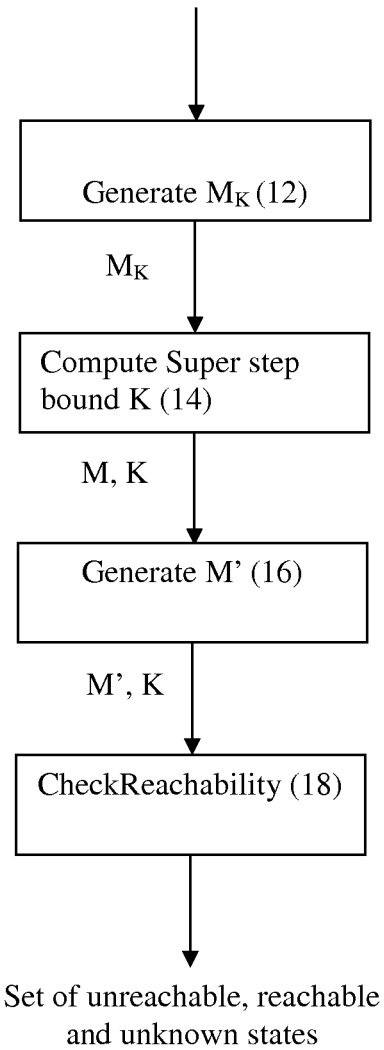
FIG. 1 illustrates flow diagram of a method for checking the reachability of any given state in a Statemate Model according to various embodiments of the invention.
Figure 2:
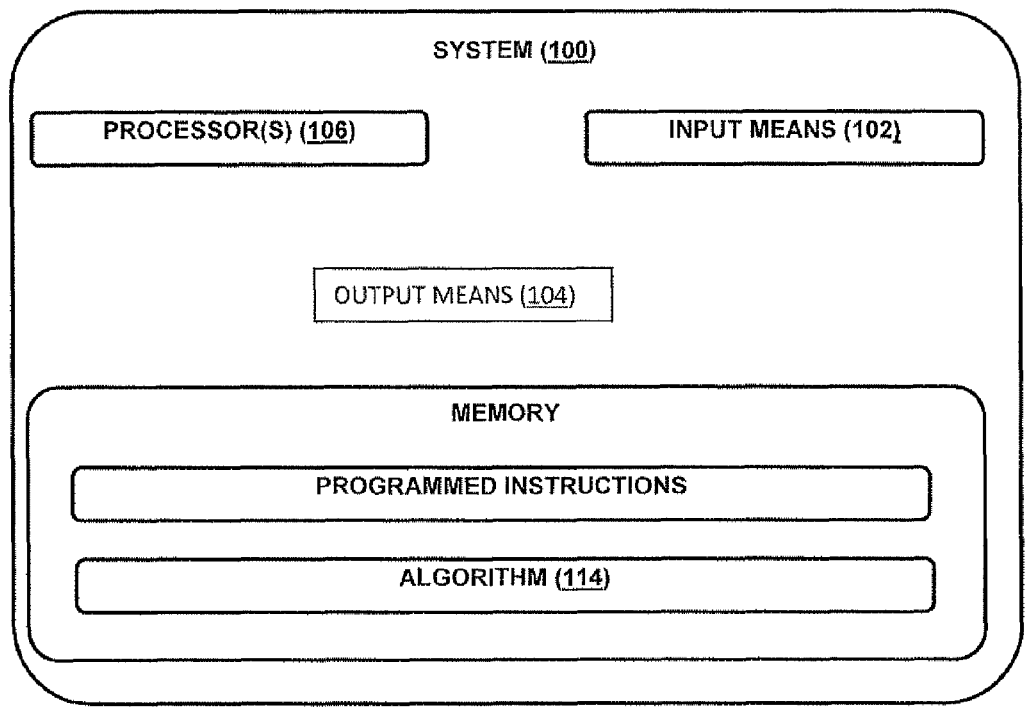
FIG. 2 illustrates a system for checking the reachability of any given state in a Statemate Model according to various embodiments of the invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

Definitions

Configuration: A configuration of Statemate model M describes a complete snapshot of M. In particular, it gives us information like the active states, live events, variable values, condition values, and so on.

Stable configuration: A configuration of Statemate model M is said to be a stable configuration if M has no reaction to perform according to the configuration.

Super step: Execution of Statemate statecharts proceeds in a sequence of steps. From the initial state, the system keeps on reacting until it reaches stable configurations. This sequence of steps, from one stable configuration to the next, is called a super step.

Unreachable state: A state is unreachable if no input can cause the system to reach the state.

The present invention provides a system and method for detecting unreachable states in a Statemate Statechart model in a novel way that is far more scalable than any other existing technique.

According to one exemplary embodiment of the invention, a system 100 (not shown in the FIGURE) for checking the reachability of any given state in a statemate model, the said system 100 comprises: an input means 102 (not shown in the FIGURE) for receiving an original statemate model (OSM) M, output means 104 (not shown in the FIGURE) for displaying the result to a user, and a processor 106 (not shown in the FIGURE), wherein the processor is capable of executing the programmed instructions to check the reachability of any given state in the statemate model. The input means 102 comprises user interface of the computing device such as computer, PDA, Laptop and etc. According to one exemplary embodiment of the invention, the input means 102 can be a user interface of the computer. The output means 104 comprises user interface of the computing device such as computer, PDA, Laptop and etc. According to one exemplary embodiment of the invention, the output means 104 can be a user interface of the computer. The processor 106 comprises computing device such as computer, PDA, Laptop, microprocessor and etc. According to one exemplary embodiment of the invention, the processor 106 can be a computer.

According to one exemplary embodiment of the invention, the processor 106 takes the M as input and outputs a set of states in the M that are unreachable under all inputs. The processor 106 also lists a set of states that are reachable and the remaining set of states as unknown.

According to another exemplary embodiment of the invention, the above said processor 106 combines the super step semantics of statemate model with bounded model checking in a novel way that is far more scalable than any other existing technique.

Initially, the user defines the input (i.e. original statemate model M and the property P to be checked, wherein the property can be reachability of the state in the M and so on. According to one embodiment of the invention, the property can be reachability of the state in the M) to the computer for checking the reachability of any given state in an M. After receiving the input from the user, the processor executes the programmed instructions to transform the M into First Statemate model (FSM) $M_K$ such that a super step bound K of $M_K$ and M is same by using translator. According to one exemplary embodiment of the invention, the M is transformed into Symbolic Analysis Laboratory (SAL) model using translator and the translator comprises SAL translator.

After the transformation, the processor 106 executes the programmed instructions to determine the super step bound K of the $M_K$, wherein the K is the maximum number of steps any super step in the M can contain. According to one exemplary embodiment of the invention, the determined maximum length of the super step is of the order of 30.

According to one embodiment of the invention, the processor 106 executes the programmed instructions to compute the super step bound K, a finite positive integer, using the below Algorithm 1. In a real statemate statechart model M, every super step must terminate in a small amount of time so that it can react to external events. Thus each super step must have a finite number of steps. The super step bound K is the maximum number of steps any super step in M can ever have. Computing the Super Step bound K by the processor 106 is as explained in the Algorithm 1:

---

Algorithm 1: Computing the Super Step Stabilization Bound

1: Add a variable B to M with the following transitions:

2. B = 0 initially,
   = 0 if M is in a stable configuration,
   = B + 1 otherwise // Let this changed model be $M_K$
3: K = 0
4: repeat // Loop to compute K
5:   K = K + 1   // increase the bound by 1
6:   P = (B < K) // this states that
7:   <r, t> = bmc($M_K$, P, K)
8: until [r = true] // P is valid up to bound K
9: I' = a super set of reachable stable configurations of $M_K$
10: $M_K'$ = <C, I', T> where $M_K$ = <C, I, T>
11: repeat
12:   K = K + 1
13:   P = (B < K)
14:   <r, t> = CheckReachability ($M_K'$, P, K)
15: until [r = true] // P is valid
16: return K

---

The loop on lines 4 to 7 starts by guessing the initial bound of 1 by the processor 106 and keeps incrementing the K by 1 until K turns out to be a valid bound for the initial super step of M. The call to bmc by the processor 106 on line 7 checks if K is a valid bound for M (bmc here stands for a call to any bounded model checker; the bmc can be selected from the group of SAL-BMC (Symbolic Analysis Laboratory-Bounded Model Checker), or SAL-INF-BMC (Symbolic Analysis Laboratory-Infinite State-Bounded Model Checker. According to one exemplary embodiment of the invention, bmc comprises the SAL bounded model checker). This call returns a 2-tuple <r, t> where r is a Boolean which is true if K is a valid bound and false otherwise. In case r is false, bmc will return a non-empty trace t. In this present invention, this trace is not needed and hence it is not used anywhere in the algorithm. The loop from lines 11 to 15 uses this initial guess K, and keeps incrementing K until K turns out to be a valid bound using the next step 114 Algorithm 2 (CheckReachability) by the processor 106. A mathematical proof of correctness, termination and time complexity of the algorithm is explained below:

Correctness Argument: Note that the first loop on Line 4 computes an upper bound K on the lengths of each initial super step, i.e., the very first super step to execute when the system starts. This is just an initial guess and may not be an upper bound for other (non-initial) super steps. Therefore, algorithm 2 uses this K as an initial guess and employs Algorithm 2 to validate K on $M_K$. If K is not a valid upper bound for $M_K$, then it keeps incrementing K until a valid K is found. Since $M_K$ is an over-approximation of M and Algorithm 2 is correct, the resulting K will be an upper bound for M too. Therefore algorithm 1 computes k correctly.

Termination Argument: Notice that Algorithm 1 terminates if both the loops in it terminate. Since our algorithm assumes a finite upper bound K on the lengths of all super steps in M, the loop on Line 4 terminates for all finite state systems. For infinite state systems, this loop terminates only if the number of initial configurations are finite, else it may not terminate. The second loop on Line 11 terminates if MK satisfies the finite K assumption and the call to Algorithm 2 on Line 14 terminates. Therefore, even for finite state systems for which MK does not satisfy the finite K assumption, this loop may not terminate. Overall, this loop terminates for finite state systems for which MK also satisfies the finite K assumption. Else it may not terminate. In practice, we never encountered a case where Algorithm 1 did not terminate.

After the determination of the maximum length of the super step bound K, the processor 106 executes the programmed instructions to transform the M into Second Statemate Model M' based on the determined length of the super step K such that the set of initial configurations of M' is a superset of the set of all stable configurations of M, wherein the M' comprises Symbolic Analysis Laboratory (SAL) model. According to one exemplary embodiment of the invention, the M is transformed into Symbolic Analysis Laboratory (SAL) model using translator and the translator comprises SAL translator. One way to realize is this is to initialize all internal events of original statemate statechart model M to FALSE (in the M') and initialize rest of the variables of the M to non-deterministic values (in the M'). This was explained in the line 9 of the Algorithm 1 for computation of Super Step Bound. After generating the M', the processor 106 executes the programmed instructions to repeatedly calls Algorithm 2 for each states in the M.

After the transformation, the processor 106 executes the programmed instructions to check the reachability of states, or any other such property, in the M' within the depth of K by using bmc, wherein the bmc can be selected from the group of SAL-BMC (Symbolic Analysis Laboratory-Bounded Model Checker), or SAL-INF-BMC (Symbolic Analysis Laboratory-Infinite State-Bounded Model Checker). According to one exemplary embodiment of the invention, the bounded model checker SAL-INF-BMC (Symbolic Analysis Laboratory-Infinite-State-Bounded Model Checker). All the states that are not reached during this iteration are unreachable in the M, because: (a) Initial configurations of M' are a super set of M's stable configurations and (b) each stable configuration of M takes maximum K steps. Since the M has to reach each reachable state in some step and all valid steps of M are contained within the first K steps of the M', if a state in M cannot be reached within the first K-steps of M' then the state cannot be reached in M at all.

According to one embodiment of the invention, checking the reachability of a state in the s M' by the processor 106 is as explained below:

Initially, the processor 106 takes 3 inputs such as the M', a property P and a depth K and sends output of the reachability of the state in the M' (result) to the output means 104 for displaying the result to the user by utilizing the algorithm 2.

3 Inputs and Output are as Defined Below:

Input M': transformed model of an actual Statemate model M, and satisfies the property that the set of initial configurations of M' is a superset of the set of all stable configurations of M Input P: the property for which M is to be checked
Input K: the super step bound K.
Output: true if M' satisfies P in depth K. False, otherwise.

---

Algorithm 2: CheckReachability (M', P, K)

1: // For a given a Statemate model <C, I, T>, this algorithm expects as input a transformed model M' = <C, I', T> i where I' is a super set of all reachable stable configurations. For our experiments, we initialized I' with configurations where internal events are false.
2: loop
3:      <r, t> = bmc(M', P, K).
4:      if r = true then // no path violating P has been found
5:          return <r, t>
6:      else if (t = [c0, . . . , cn]) and (c0 ∈ I) then // t is the path found
7:          return <r, t>
8:      else 9:      let P' be a predicate such that:

$$P'(c) = \text{false, if } c = c0;$$
   $$= \text{true, otherwise.}$$

10:     <r1, t1> = CheckReachability(<C; I'\{C0}, T>, P', K)
11:     if r1 = true then
12:         I' = I'\{c0}
13:     else
14:         return <false, t1 .t> // t1 concatenated with t
15:     end if
16: end if
17: end loop // End of algorithm

---

In the Algorithm 2, lines 2 to 5 checks M' for P in depth K. If M' violates P in depth K, then the trace t is the sequence of configurations <c0, c1, . . . cn> that M' transits through. If co belongs to I, the set of initial configurations, then c0 is an initial configuration of M and hence t is a valid trace in M. This is coded in lines 6 & 7 of the algorithm. If co is not an initial configuration of M, and if c0 cannot be reached in M then t is an incorrect trace and it must have been introduced due to transformation of M into M'. Lines 9 to 15 check if t is a valid trace in M. If so, then M satisfies P, else M violates P. A mathematical proof of correctness, termination and time complexity of the Algorithm 2 is explained below:

Case 1. Return from Line 5: this return states that the configuration is not reachable. If a configuration is reachable in M (the original model), then $\exists [c_0, \ldots, c_1, \ldots, c_n]$ such that: |

$[c_0, \ldots, c_l, \ldots, c_n]$ is a run and $n$ is the length of the path $0 \le l \le n$ such that $c_l$ is the last stable configuration in the run $[c_0, \ldots, c_n]$ $c_l \in I'$ – by definition of $I'$ $(n - l) \le K$ – by definition of $K$ Since $c_l \in I'$ and the distance from $c_1$ to $c_n$ is less than K, the call to bmc at Line 3 would have returned the path. Intuitively, if there is a path in the original model reaching the violating configuration then the configuration will be at a distance of less than K from a stable configuration and the call to bmc at Line 3 would find that path.

Case 2. Return from Line 7: when the algorithm returns a run from 7, the returned run is also a run of the original model M since $c_0 \in I$.|

Case 3. Return from Line 14: In this case, the algorithm returns a run. Assume that the recursive call to Check-Reachability at 10 returns correctly. Therefore:

If the call returned a run [ck, ... c0] in M, since the bmc call earlier at Line 3 would have found a run from c0 to cn, concatenating these two gives a run in M to cn.

If the call returned stating that c0 is not reachable, then there exists no run to cn via c0 in M and hence we need to find a run via a stable configuration other than c0. This is what is done at Line 12

Note that the algorithm will terminate for all finite state systems. This is because in the case of finite state systems I' will have a finite number of configurations and both the recursive call and loop iteration strictly reduce this size. However, for infinite state systems the algorithm may not terminate due to Line 12. If M is an infinite state system and M' has infinitely many unreachable stable configurations that can violate P and then Line 12 may cause the algorithm to loop forever.

According to various exemplary embodiments of the invention, the above said system can be used to detect the unreachable states in the M by using bmc on M', cheek iteratively the M' for state reachability within a depth of the determined length of the super step K by using bmc for establishing the unreachability of the unreachable states in the M and verify any given property of the M by using bmc upto the determined length of the super step on the M'.

According to one exemplary embodiment of the invention, the result comprises set of unreachable states, set of reachable states, set of unknown states, status of the reachability of the state, and verification of any given property of the statemate model.

FIG. 1 illustrates flow diagram of a method for checking the reachability of any given state in a Statemate Model according to various embodiments of the invention. A method 10 for checking the reachability of any given state in a statemate model is proposed, the said method comprising the various processor implemented steps. Initially, a user defines the input (i.e. original statemate model M and the property P to be checked, wherein the property can be reachability of the state in the M and so on. According to one embodiment of the invention, the property can be reachability of the state in the M) via an input means 102 to a processor 106 for checking the reachability of any given state in an M. The processor 106 checks the reachability of any given state in an M and sends the results to an output means for displaying the result to the user.

The input means 102 comprises user interface of the computing device such as computer, PDA, Laptop and etc. According to one exemplary embodiment of the invention, the input means 102 can be a user interface of the computer. The output means 104 comprises user interface of the computing device such as computer, PDA, Laptop and etc. According to one exemplary embodiment of the invention, the output means 104 can be a user interface of the computer. The processor 106 comprises computing device such as computer, PDA, Laptop, microprocessor and etc. According to one exemplary embodiment of the invention, the processor 106 can be a computer.

According to one exemplary embodiment of the invention, the processor 106 takes the M as input and outputs a set of states in the M that are unreachable under all inputs. The processor 106 also lists a set of states that are reachable and the remaining set of states as unknown.

According to another exemplary embodiment of the invention, the above said processor 106 combines the super step semantics of statemate model with bounded model checking in a novel way that is far more scalable than any other existing technique.

In the first step 12 of the proposed method, transforming the M into First Statemate model (FSM) $M_K$ such that a super step bound K of $M_K$ and M is same using translator by the processor. According to one exemplary embodiment of the invention, the M is transformed into Symbolic Analysis Laboratory (SAL) model using translator by the processor and the translator comprises SAL translator.

In the next step 14 of the proposed method, determining the super step bound K of the $M_K$ by the processor 106, wherein the K is the maximum number of steps any super step in the M can contain. According to one exemplary embodiment of the invention, the determined maximum length of the super step is of the order of 30.

According to one embodiment of the invention, the processor 106 computes the super step bound K, a finite positive integer, using the below Algorithm 1. In a real statemate statechart model M, every super step must terminate in a small amount of time so that it can react to external events. Thus each super step must have a finite number of steps. The super step bound K is the maximum number of steps any super step in M can ever have. Computing the Super Step bound K by the processor 106 is as explained in the Algorithm 1.

In the next step of the 16 of the proposed method, transforming the M into Second Statemate Model M' based on the determined length of the super step K by the processor 106 executes the programmed instructions to such that the set of initial configurations of M' is a superset of the set of all stable configurations of M, wherein the M' comprises Symbolic Analysis Laboratory (SAL) model. According to one exemplary embodiment of the invention, the M is transformed into Symbolic Analysis Laboratory (SAL) model using translator and the translator comprises SAL translator. One way to realize is this is to initialize all internal events of original statemate statechart model M to FALSE (in the M') and initialize rest of the variables of the M to non-deterministic values (in the M'). This was explained in the line 9 of the Algorithm 1 for computation of Super Step Bound. After generating the M', Algorithm 2 for each states in the M is called repeatedly by the processor 106.

In the next step 18 of the proposed method, checking the reachability of states, or any other such property, in the M' within the depth of K by using bmc by the processor 106, wherein the bmc can be selected from the group of SAL-BMC (Symbolic Analysis Laboratory-Bounded Model Checker), or SAL-INF-BMC (Symbolic Analysis Laboratory-Infinite State-Bounded Model Checker). According to one exemplary embodiment of the invention, the bounded model checker SAL-INF-BMC (Symbolic Analysis Laboratory-Infinite-State-Bounded Model Checker). All the states that are not reached during this iteration are unreachable in the M, because: (a) Initial configurations of M' are a super set of M's stable configurations and (b) each stable configuration of M takes maximum K steps. Since the M has to reach each reachable state in some step and all valid steps of M are contained within the first K steps of the M', if a state in M cannot be reached within the first K-steps of M' then the state cannot be reached in M at all.

According to one embodiment of the invention, checking the reachability of a state in the s M' by the processor 106 is as explained in the Algorithm 2.

According to various exemplary embodiments of the invention, the method is capable of detecting the unreachable states in the M by using bmc on M', checking iteratively the M' for state reachability within a depth of the determined length of the super step K by using bmc for establishing the unreachability of the unreachable states in the M and verifying any given property of the M by using bmc upto the determined length of the super step on the M'.

According to one exemplary embodiment of the invention, the result comprises set of unreachable states, set of reachable states, set of unknown states, status of the reachability of the state, and verification of any given property of the statemate model.

The invention is described in the example given below which is provided only to illustrate the invention and therefore should not be construed to limit the scope of the invention.

The invention (system and method for verification of properties of safety-critical embedded software requirement in the statemate statechart models) has been applied (tested) to the Statemate specifications of an ECU that controls the back door functionality of a car. The specification consists of 108 Statecharts that includes 407 basic states.

For the experiment, we analysed all the 368 states that were required to analyse one arbitrarily chosen Statechart. The Statemate model checker as mentioned in the reference number 1 of the prior-art references is unable to analyse this specification for any property. Complete model checking using the symbolic model checker of SAL also fails to analyse the specification. SAL's k-induction feature as mentioned in the reference number 5 of the prior-art references too does not scaleup, whereas super step analysis scales up for all but one state.

Our analysis yielded a bound of 20 for super step lengths. The corresponding analysis for a bound on the super step lengths using sal-inf-bmc's k-induction feature with a value of 2 for k ran out of memory.

The translator produced two SAL files sal-m and sal-m0. The file sal-m was analysed for reachability of the 368 states using sal-inf-bmc for different bounds up to 25. The analysis reported 362 states as reachable, For the remaining 6 states, sal-inf-bmc did not scale up when tried for a bound of 30. The sal-m0 was then used to perform super step analysis on the remaining 6 states. The analysis reported 5 of these as unreachable and did not scale up for 1. The results are summarized in Tables 1 and 2.

TABLE 1

| Number of Statecharts in the Model | Number of Basic States | Total States Analyzed | Super Step Bound |
|---|---|---|---|
| 108 | 407 | 368 | 20 |

TABLE 2

| States Analyzed | Reachable State | Un-reachable states | Scale up problem |
|---|---|---|---|
| 368 | 362 | 5 | 1 |

An independent team was assigned the task of manually verifying the unreachable states reported by our invention. This team confirmed, after thorough inspection of the statechart model, that the states were indeed unreachable.

The entire analysis took less than two minutes per state on a Pentium IV machine with 2 GB RAM, 3 GHZ and running Windows XP. We next analyzed the file sal-m for the 5 unreachable states using sal-inf-bmc's k-induction feature. It gave spurious paths for small values of k and did not scale up for larger values.

The system and method of the proposed invention can be used for
1) Verification of properties of safety-critical can be embedded software requirement in the statemate statechart models such as Automotive and Avionics is life-critical and business-critical.
2) Scaling up model checking to large commercial Statemate models.

The preceding description has been presented with reference to various embodiments of the invention. Persons skilled in the art and technology to which this invention pertains will appreciate that alterations and changes in the described systems and methods of operation can be practiced without meaningfully departing from the principle, spirit and scope of this invention.

What is claimed is:

1. A system for checking statuses of states in a Statemate Model using bounded model checking (BMC), the system comprises:
   an input means for receiving an Original Statemate Model (OSM), and
   a processor coupled to the input means, wherein the processor is capable of executing certain programmed instructions to:
      transform the OSM into a First Stalemate Model (FSM), wherein the FSM comprises a set of initial FSM configurations, and wherein the set of initial FSM configurations is a super set of all stable OSM configurations;
      determine a maximum length of a biggest super step among the set of initial FSM configurations, wherein the maximum length is indicative of a maximum number of steps possible between any two successive stable reachable OSM configurations;
      transform the OSM into a Second Statemate Model (SSM) based on the maximum length of the biggest super step by initializing
         a) all internal events of the OSM to false, and
         b) rest of the variables of the OSM to non-deterministic values,
      wherein the SSM comprises a set of initial SSM configurations, and wherein the set of initial SSM configurations is a superset of all the stable OSM configurations;
      identify unreachable states of the OSM by analyzing only the set of initial configurations of the SSM by using a bounded model checker (BMC) with a bound as the maximum length of the biggest super step, wherein each of the initial super steps in the SSM are analyzed, without analyzing additional configurations of the SSM beyond the initial configuration; and
      send information associated with the un-reachable states to an output means.

2. The system of claim 1, wherein identifying the un-reachable states of the OSM comprises checking un-reachability of all states of the SSM within a depth indicated by the maximum length of the biggest super step by using BMC for establishing un-reachability of the states of the OSM.

3. The system of claim 1, wherein the maximum length of the biggest super step is 30.

4. The system of claim 1, wherein the FSM comprises a Symbolic Analysis Laboratory (SAL) model.

5. The system of claim 1, wherein the SSM comprises a Symbolic Analysis Laboratory (SAL) model.

6. The system of claim 1, wherein the translator comprises a Symbolic Analysis Laboratory (SAL) translator.

7. The system of claim 1, wherein the BMC is one of a SAL-BMC (Symbolic Analysis Laboratory-Bounded Model Checker), or SAL-INF-BMC (Symbolic Analysis Laboratory-Infinite State-Bounded Model Checker).

8. A method for checking statuses of states in a Statemate Model using bounded model checking (BCM), the method comprising processor implemented steps of:
  receiving an Original Statemate Model (OSM);
  transforming the OSM into a First Statemate Model (FSM), wherein the FSM comprises a set of initial FSM configurations, and wherein the set of initial FSM configurations is a super set of all stable OSM configurations;
  determine a maximum length of a biggest super step among the set of initial FSM configurations, wherein the maximum length is indicative of a maximum number of steps possible between any two successive stable reachable OSM configurations;
  transforming the OSM into a Second Statemate Model (SSM) based on the maximum length of the biggest super step by initializing
  a) all internal events of OSM to false, and
  b) rest of the variables of the OSM to non-deterministic values,
  wherein the SSM comprises a set of initial SSM configurations, and wherein the set of initial SSM configurations is a superset of all the stable OSM configurations;
  identifying unreachable states of the OSM by analyzing only the set of initial configurations of the SSM by using a bounded model checker (BMC) with a bound as the maximum length of the biggest super step, wherein each of the initial super steps in the SSM are analyzed, without analyzing additional configurations of the SSM beyond the initial configuration; and
  sending information associated with the un-reachable states to an output means.

9. The method of claim 8, wherein the identifying the un-reachable states of the OSM comprises checking un-reachability of all states of the SSM within a depth indicated by the maximum length of the biggest super step by using BMC for establishing the un-reachability of the states of the OSM.

10. The method of claim 8, wherein the maximum length of the biggest super step is 30.

11. The method of claim 8, wherein the FSM comprises a Symbolic Analysis Laboratory (SAL) model.

12. The method of claim 8, wherein the SSM comprises a Symbolic Analysis Laboratory (SAL) model.

13. The method of claim 8, wherein the translator comprises a Symbolic Analysis Laboratory (SAL) translator.

14. The method of claim 8, wherein the BMC is one of a SAL-BMC (Symbolic Analysis Laboratory-Bounded Model Checker), or SAL-INF-BMC (Symbolic Analysis Laboratory-Infinite State-Bounded Model Checker).

\* \* \* \* \*